United States Patent [19]

Peled et al.

[11] Patent Number: 4,755,440

[45] Date of Patent: Jul. 5, 1988

[54] ELECTROCHEMICAL CELL

[75] Inventors: Emanuel Peled, Even Yehuda; Ester Elster, Kfar-Saba; Josef Kimel, Petach-Tikva; Mordechai Brand, Tel Aviv, all of Israel

[73] Assignee: Ramot University For Applied Research and Industrial Development Ltd., Tel Aviv, Israel

[21] Appl. No.: 10,303

[22] Filed: Feb. 2, 1987

[30] Foreign Application Priority Data

Feb. 4, 1986 [IL] Israel .................................. 77786

[51] Int. Cl.$^4$ .................................. H01M 10/36
[52] U.S. Cl. .................................. 429/101; 429/196
[58] Field of Search ................ 429/101, 194, 196, 197

[56] References Cited

U.S. PATENT DOCUMENTS 4,352,866  10/1982  Klinedinst et al. .................. 429/196
4,461,815  7/1984   Peled et al. ........................ 429/196
4,474,863  10/1984  Behl .................................... 429/196

OTHER PUBLICATIONS

Peled et al., (II), Calcium/Ca(AlCl$_4$)$_2$-Thionyl Chlorides Cells Effects of Temperature and Cell Parameters on Performance, J. Power Sources 14, 93–98 (1985).

Primary Examiner—Donald L. Walton
Attorney, Agent, or Firm—Browdy and Niemark

[57] ABSTRACT

The invention relates to an electrochemical cell which is safe even under adverse conditions and abuse. The cells comprise an alkaline metal anode, a current collector and an inorganic oxyhalide liquid cathode which contains an alkaline earth metal salt in a suitable solvent, such as thionyl chloride. The cell may contain sulfur dioxide dissolved in the solvent. Suitable salts are alkaline earth metal aluminum chlorides.

14 Claims, 10 Drawing Sheets

ELECTROCHEMICAL CELL

FIELD OF THE INVENTION

The present invention relates to a novel electrochemical high-energy cell which is safe in use, and which even under conditions of abuse is not likely to create a hazard or to explode. The novel cells comprise an alkaline earth metal anode selected from magnesium, calcium, barium and strontium or a dischargeable alloy of same, practically devoid of an alkali metal in the alloy, a porous inert current collector and an inorganic oxyhalide solvent wherein there is dissolved a suitable alkaline earth metal salt or mixture of such salts; when the liquid cathode is only calcium-aluminum chloride, the cell contains a high concentration of sulfur dioxide. The solvent of choice is thionyl chloride, which may contain a high concentration of $SO_2$, and which can also be termed as liquid cathode. The salt of choice which is dissolved in the oxyhalide is an alkaline earth metal aluminum chloride. In this specification M stands for an alkaline earth metal.

BACKGROUND OF THE INVENTION

The lithium-thionyl chloride cell has the highest energy density of commercially available primary cells. It has a very good low- and high-temperature performance, excellent shelf life and a very high power density in its high-rate configuration. However, the major obstacle to the commercialization of a high-rate type cell, and in particular a high-rate multi-cell battery, is the well known explosion hazard during reversal or charging. This hazard is common to all high-rate nonaqueous lithium batteries. Reversal of one or more cells or the charging of one row of cells by another row connected in parallel is likely to happen during deep discharge. The reason for this is that lithium is deposited at low over-potentials, on itself, or on a passivated cathode. The metallic lithium which deposits under these conditions is likely to have a large active surface area. At a high deposition rate, a powder-like lithium deposit can be formed. The presence of lithium powder in a thionyl-chloride cell can create a very hazardous situation. On prolonged reversals or charging of a lithium cell there is the danger of an internal short circuit due to lithium dendrite growth. This may lead to internal spark which can rapidly melt, or even evaporate, the lithium dendrite, thereby initiating a cell explosion. This explosion process is more likely to happen in a partially discharged cell where less electrolyte is available to cool the spark area.

U.S. Pat. Nos. 4,184,014, 4,093,794 and 4,042,756 and German Pat. No. 2,262,256, claim electrochemical cells having an alkali metal or alkaline earth metal as anode, an oxyhalide as solvent/cathode material and some unspecified electrolyte salt or electrolyte salt consisting of lithium as cation and an anion. Israel Pat. No. 63336 and U.S. Pat. No. 4,461,815 claims a safe cell which even under conditions of abuse is not likely to create a hazard or to explode. It is based on calcium (or magnesium) or dischargeable alloy of same, devoid of an alkali metal in the alloy, on a porous inert current collector, and on the use of an inorganic oxyhalide solvent wherein there is dissolved a suitable calcium salt. The cell according to U.S. Pat. No. 4,461,815 having 99.9% Ca anode and 0.95M $Ca(AlCl_4)_2$ in $SOCl_2$ solution has a shelf life of about 1.5 to 2 years at room temperature. This cell lost about 10% of its capacity after two weeks of storage at 70° C. [Peled, Elster, Tulman and Kimel, J. Power Sources 14, 93 (1985)].

In the following M designates an alkaline earth metal.

SUMMARY OF THE INVENTION

The present invention relates to a novel primary electrochemical high energy and high power density cell. The novel cell has a high energy and power density, it has a very good storage properties and can be produced in a high-rate configuration without any danger of explosions on misuse of the cell.

The novel cell comprises an alkaline earth metal anode (preferably calcium, strontium or barium or a dischargeable alloy thereof;) a suitable inert current collector such as Teflon-bonded carbon; and a liquid cathode comprising an inorganic oxyhalide such as thionyl chloride or sulfuryl chloride wherein there is dissolved a suitable alkaline earth metal salt practically devoid of alkali metal salts. The solution may include a tetralkyl ammonium halide or a halogenated (chlorinated or fluorinated) hydrocarbon. All alkaline earth metals have a melting point of above 650° C., which is much higher than that of lithium (180.5° C.), and thus the probability that an internal spark will lead to melting or evaporation of these metals is much smaller than with lithium. Experiments have shown that, in practice it is impossible to charge or overdischarge an $M/M(AlCl_4)_2$ thionyl chloride or sulfuryl chloride cell. The "charging" current density of undischarged $M/M(AlCl_4)_2$ thionyl chloride cell is typically 1–0.1 $mAcm^{-2}$ after 5 min of "charging" at 20 V and 0.3–0.03 $mAcm^{-2}$ after several hours of charging at that voltage. From 3–80 volume % $SO_2$ may be added to the liquid cathode, calculated on the liquid cathode.

The current density of $M/M(AlCl_4)_2$ sulfuryl cells under similar conditions are to some extent higher. A similar phenomenon was observed when fully discharged $M/M(AlCl_4)_2$-thionyl chloride (or sulfuryl chloride) cells were overdischarged.

At overdischarge current density of 2–5 $mAcm^{-2}$ the voltage climbs to 20 V in 1 to 30 minutes (the maximum voltage of the power supply) and then the current density drops to similar levels as in the "charging" tests. Encouraging electrical performance of a half D size and of 600Ah $Ca/Li(AlCl)_4$-thionyl chloride cells was recently demonstrated by R. Huggins et al., Proc. 29th Power Sources Symp, 1980, Atlantic City. The 600Ah cells have been demonstrated to be safe to many abuse tests in their low-surface-area versions. However, they were unsafe to bullet penetration in their high-surface area version. Alkaline earth metal-thionyl chloride cells based on $M(AlCl_4)_2$ electrolyte are basically safer than calcium cells based on $LiAlCl_4$ electrolyte.

In the present invention, the current collector may, for example, be a porous current collector containing 1–50% of catalysts selected from Ni, Cr, Pt, Au and Co in the form of metallic powder or compounds of these metals.

Alkaline earth metal and lithium-thionyl chloride cells belong to the family of Solid Electrolyte Interphase (SEI) nonaqueous batteries, U.S. Pat. No. 4,224,389 (1980). The batteries of this family have anodes which are always covered by a film which separates them from the solution. This film has the properties of a solid electrolyte and it is a very poor electronic conductor but a rather good ionic conductor.

In these batteries, the oxyhalide serves both as the solvent for the electrolyte and as liquid cathode. The composition of the passivating layer of lithium is LiCl while that of M is $MCl_2$. The transference number of $Li^+(t_+)$ in LiCl at room temperature is about 1.

The rate-determining step (rds) for the deposition-dissolution process of lithium in thionyl chloride is the migration of lithium ions through the SEI. The mechanism of deposition dissolution of barium, strontium, calcium or magnesium in thionyl chloride solutions is more complex as the $CaCl_2$, $BaCl_2$, $SrCl_2$ or $MgCl_2$ which covers the anode have $t_+$ values smaller than 1. During deposition of calcium, barium, strontium, or magnesium in thionyl chloride or sulfuryl chloride solutions there is a blocking mechanism of the cationic current through the SEI. As a result the ionic resistivity of the SEI increases and a very high electric field is formed leading finally to the electrolytic breakdown of the SEI and to the reduction of the solvent. This takes place at voltage typically higher than 30–40 V.

The novel cells according to the present invention are based on an alkaline earth metal oxyhalide cathode in liquid form. It ought not to contain any appreciable quantity of lithium or other alkali metals. The use of $M^{2+}$ as sole cations ensures the safety of the cell during abuse while discharging the cell and during charging. This is to be contrasted with lithium salt oxyhalide cells which may explode when charged or overcharged under extreme conditions.

The invention is illustrated by way of example with reference to the enclosed drawings and figures, in which.

Figure 1:
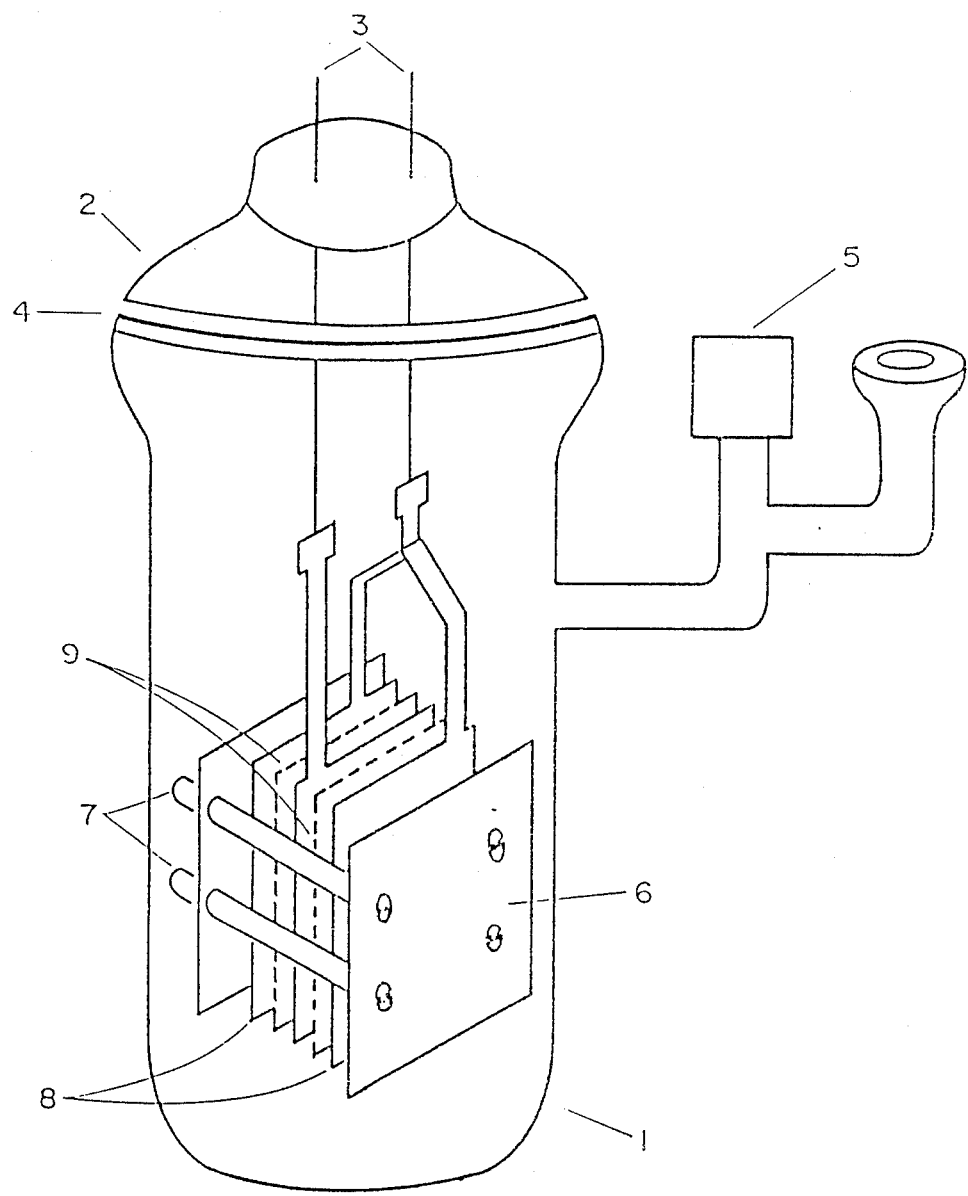
FIG. 1 is a perspective schematical view, not according to scale, of a cell according to the invention (without electrolyte)

An experimental cell is illustrated in FIG. 1. This is a sandwich-type glass laboratory cell. This cell comprises a glass cell 1, a glass cover 2, tungsten rods 3 sealed in the glass cover, a Viton O-ring 4, a rotaflo stopcock 5, a stainless steel plate 6, stainless steel bolts 7, alkaline earth metal anodes 8, a glass paper separator 9, and a carbon current collector 10. The liquid cathode is not shown.

Figure 2:
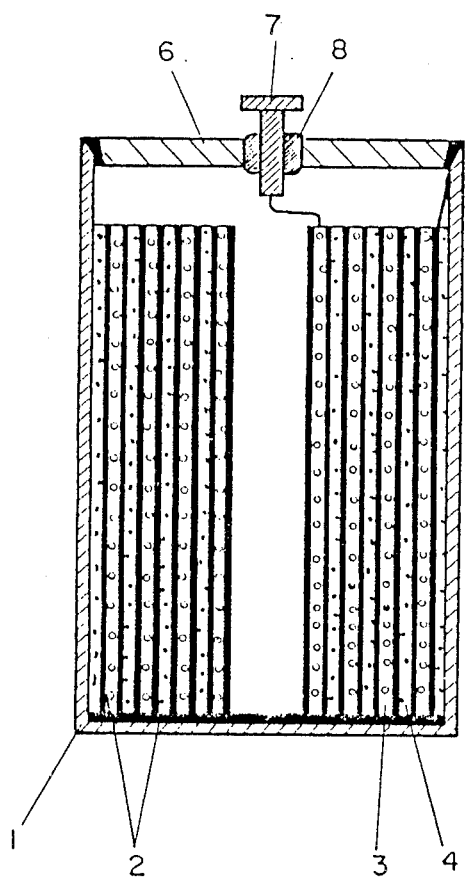
FIG. 2 is an elevational sectional view through another embodiment of a cell according to the invention.

The invention is further illustrated with reference to FIGS. 2 to 6. In these:

FIG. 2 is an elevational schematic cross-section through a rolled (wound) high-rate cell size C. Dimension: Height 50 mm; diameter: 25 mm. 11-case; 12-separator; 13-calcium anode connected to pin 17-in glass metal seal 15; 14-carbon cathode (connected to case); 16-cover TIG-welded to case.

Figure 3:
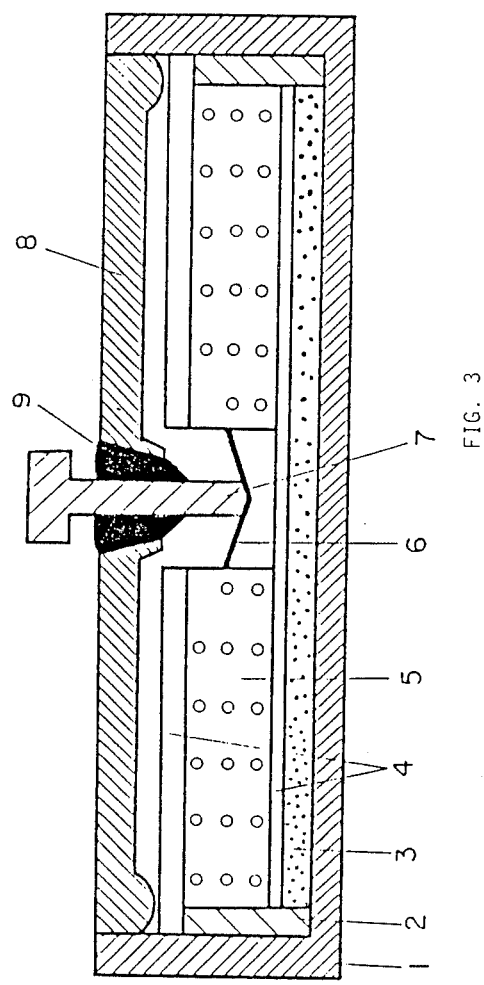
FIG. 3 is an elevational sectional view through another embodiment of a cell according to the invention.

FIG. 3 is an illustration of 1/100 size button cell having 0.6Ah capacity; 31-stainless steel case; 32-insulator; 33-calcium; 34-separator; 35 porous carbon cathode; 36-cathode current connector; 37-pin; 38-cover; 39-glass metal seal; 40-separator.

The electrolytes used in all investigations were prepared inside an argon-filled glove box by the addition of vacuum-sublimed $AlCl_3$ (Fluka, A. R.) to vacuum-distilled $SOCl_2$, (Merck Zur Synthesis). Then vacuum dried $MgCl_2$, $CaCl_2$, $BaCl_2$, or $SrCl_2$ was (were) added ($\sim$10% in excess), and solution was refluxed for 16 hours. The exact concentration of $Ca(AlCl_4)_2$ or $LiAlCl_4$ solution was determined by atomic absorption. The calcium metal 99.9, 0.5 mm thick (Pfizer) was degreased in acetone and annealed at 450°–750° C. for two hours. Then it was transferred to a glove box. The experiments were performed with hermetically sealed glass cells. The cells for discharge had a "sandwich-like" construction. They contained a flat 1.0 mm thick Teflon (6%) bonded carbon cathode (87% porous) which was inserted between two calcium foils which served as anodes. The electrode area, on both sides of the cathode, was ca. 10 cm$^2$. A non-woven 0.18 mm thick glass paper was inserted between the cathode and the anodes. The electrodes were supported by two stainless-steel plates, held together with four bolts tightened at constant force. The complete construction of this cell is presented in FIG. 1. The discharge experiments were performed by connecting the cell to a suitable resistor. The temperature was controlled (to +0.5° C.) by immersing the cell in a thermostated oil bath (Refrigerated Circulating Bath, RTE-4, Neslab prod.). The discharge curves were recorded on a Telrad, Model 712 recorder.

Charging, reversal, or electrolysis were performed with a P.A.R. potentiostat/galvanostat Model 173. Barium and strontium cells were constructed in a similar manner as FIG. 1. However, in these, the effective electrode area was 1 cm$^2$. They have a single anode and 0.6 mm thick cathode. The calcium, separator and cathode are arranged as a "sandwich" and rolled into a helical configuration, the elevational cross-section of which is shown in this Figure. The effective electrode area was 130 cm$^2$.

Conductivity and Stability of Solutions $Ca(AlCl_4)_2$, $Ba(AlCl_4)_2$ and $Sr(AlCl_4)_2$—$SOCl_2$ solutions found to be stable and conductive in a very broad temperature range −40° to +250° C. These solutions were cycled twice between −40° to +250° C. and gave the same conductivity on heating and on cooling indicating its stability. Table 1 summarizes the conductivity data, for 1 Molar $SOCl_2$ solutions. The addition of about 10% (Volume) $SO_2$ to these solutions increases the conductivity by 40–50%. The addition of 20–30% $SO_2$ to these solutions increases the conductivity by about 100%.

TABLE 1

| Conductivity of 1M $SOCl_2$ solutions, (mMhocm$^{-1}$) | | | |
|---|---|---|---|
| Temperature (°C.) | 1M $Sr(AlCl_4)_2$ | 1M $Ca(AlCl_4)_2$ | 1M $Ba(AlCl_4)_2$ |
| −40 | 1.5 | 1.9 | 1.1 |
| 0 | 2.8 | 4.8 | 2.4 |
| 20 | 3.4 | 5.0 | 3.2 |
| 100 | 7.5 | 6 | 7 |
| 200 | 8 | 6.5 | 8 |
| 250 | | | |

Corrosion Tests

The state of art Ca/Ca(AlCl$_4$)$_2$—SOCl$_2$ battery system has a self discharge rate (corrosion of calcium) of about 10% for two weeks of storage at 70° C. The replacement of Ca(AlCl$_4$)$_2$ electrolyte salt by Ba(AlCl$_4$)$_2$ or Sr(AlCl$_4$)$_2$ or a mixture of these results in a decrease of the corrosion rate of calcium This can be seen in Table 2. The addition of 20-30% (Volume) of SO$_2$ changes the corrosion process of calcium in a favourable way. Prolonging (more than two weeks) the storage of calcium in Ca(AlCl$_4$)$_2$—SOCl$_2$ solutions at 70° C. sometimes results in nonuniform corrosion being higher at some spots at the edge of the calcium foil. In the presence of 20-30% (V) SO$_2$ the corrosion is uniform, holes and pits free, and to some extent slower than in its absence. A nonuniform corrosion of the anode may be harmful to the cell as it may cause premature failure due to disintegration, or cracking of the anode.

TABLE 2

Corrosion tests of calcium in SOCl$_2$ solutions at 71° C.

| Electrolyte | Storage Time (weeks) | Corrosion Rate mg/cm$^2$ · week |
|---|---|---|
| 1M Ca(AlCl$_4$)$_2$ | 4 | 2.8 ± 0.3 |
| 1M Ba(AlCl$_4$)$_2$ | 4 | 1.0 ± 0.3 |
| 1M Sr(AlCl$_4$)$_2$ | 4 | 1.0 ± 0.3 |
| 1M Sr(AlCl$_4$)$_2$ | 8 | 0. |
| 0.5M Sr(AlCl$_4$)$_2$ + 0.5M Ca(AlCl$_4$)$_2$ | 4 | 2.0 ± 0.4 |
| 1M Ca(AlCl$_4$)$_2$ + 30 SO$_2$ | 4 | 2.4 ± 0.3 |

Cell Discharge Tests

Many combinations of M/M(AlCl$_4$)$_2$—SOCl$_2$/C cells have been tested (M=Sr, Ba, Ca, Mg).

EXAMPLE 1

Figure 4:
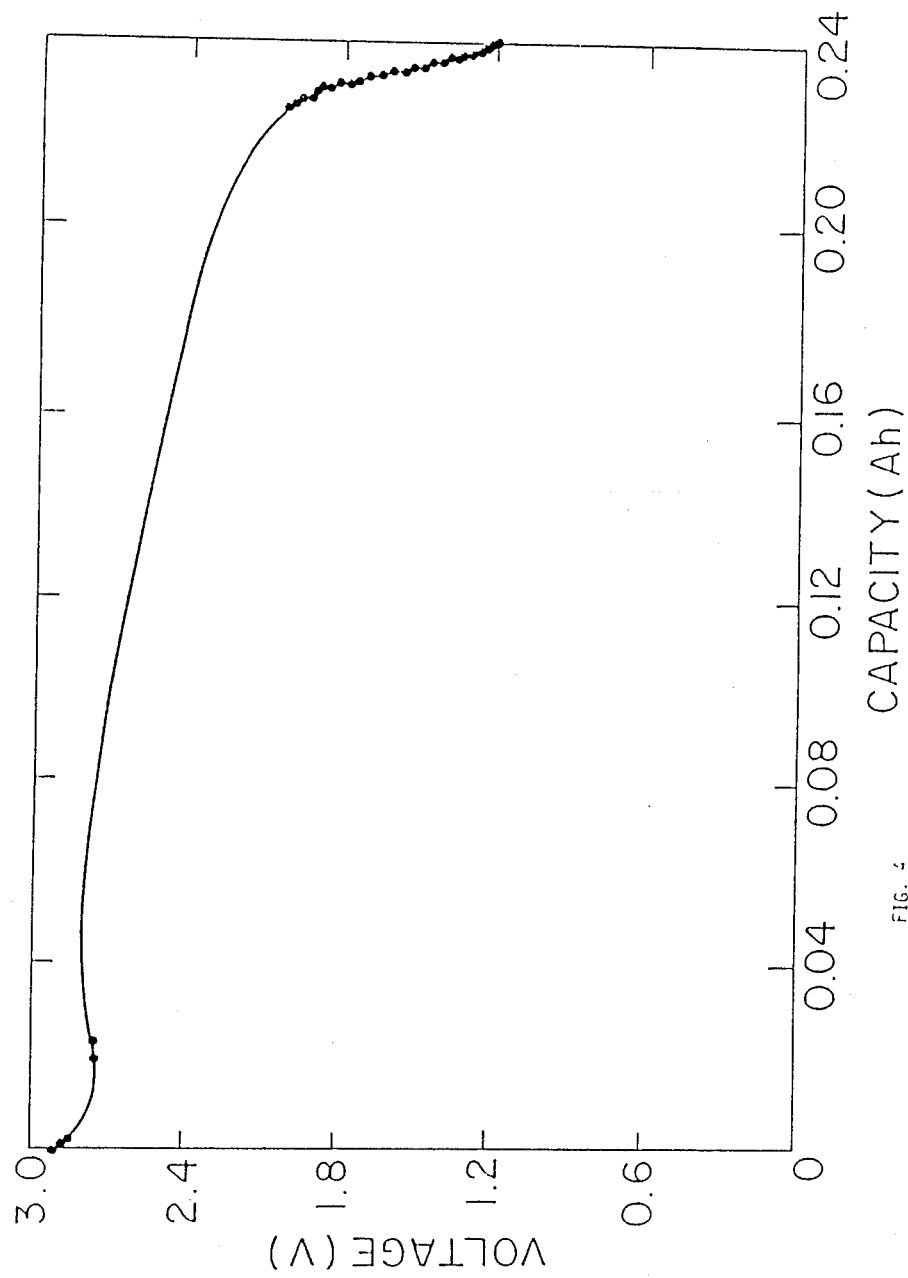
FIG. 4 is a graph of the discharge of a cell of the invention.

FIG. 4 is a discharge curve of a 10 cm$^2$ "sandwich like" Ca/1M Ba(AlCl$_4$)$_2$—SOCl$_2$ cell (FIG. 1) at 1 mAcm$^{-2}$. The OCV of this cell was 3.15 V and its average working voltage (at 1 mAcm$^{-2}$) was 2.7 V. The cell worked for 24 hours to a cut off voltage of 2 V.

EXAMPLE 2

Figure 5:
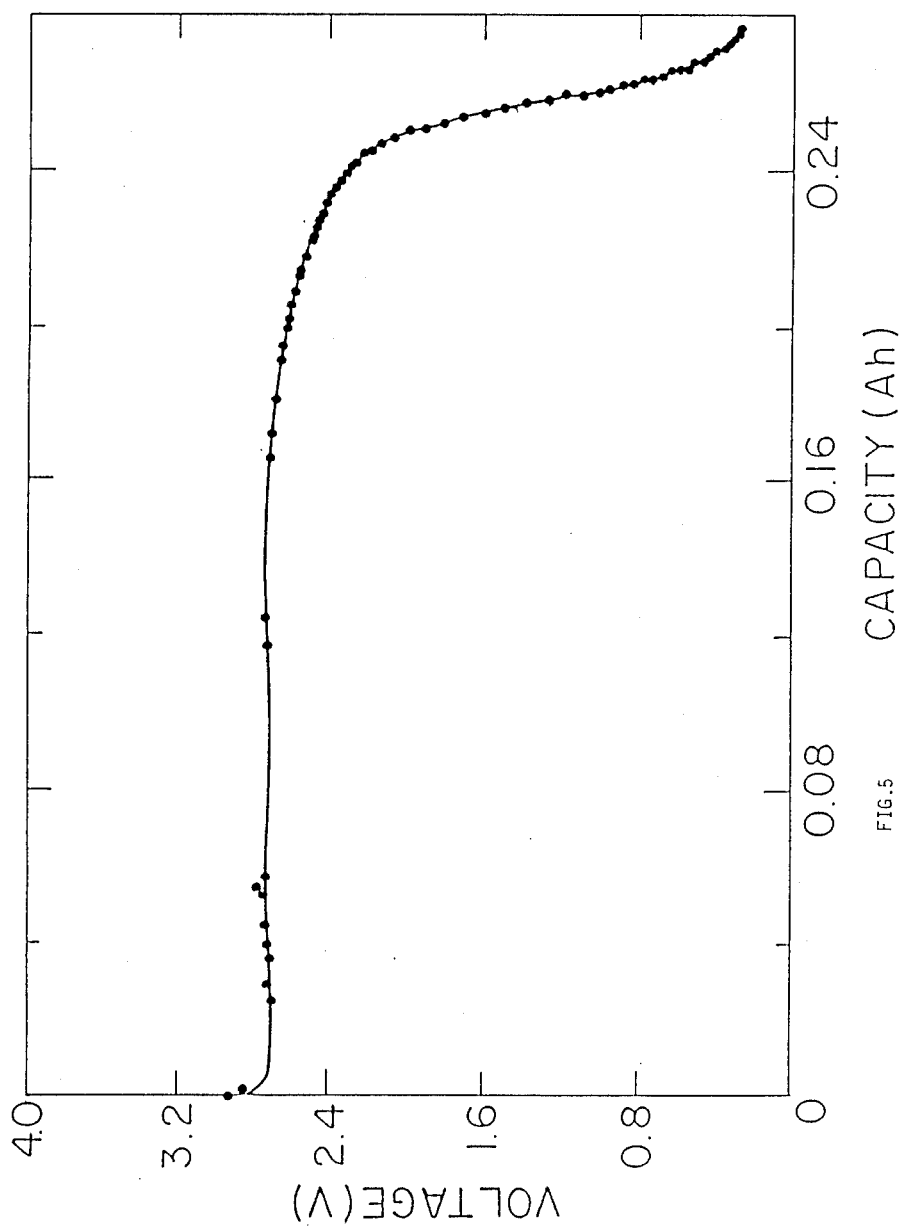
FIG. 5 is a graph of the discharge of another cell of the invention.

FIG. 5 is a discharge curve of 10 cm$^2$ sandwich like Ca/1M Sr(AlCl$_4$)$_2$—SOCl$_2$/C cell at 1 mAcm$^{-2}$. The OCV of this cell was 3.15 V and its working voltage was 2.7 V (flat curve). It worked for 25 hours.

EXAMPLE 3

A 1/10 D size hermetically sealed cell (FIG. 3) with Ca anode and 1M Sr(AlCl$_4$)$_2$—SOCl$_2$ solution was discharged at 165° C. for 20 hours at 0.5 mAcm$^{-2}$. Its average working voltage was 3.0 volt.

EXAMPLE 4

Figure 6:
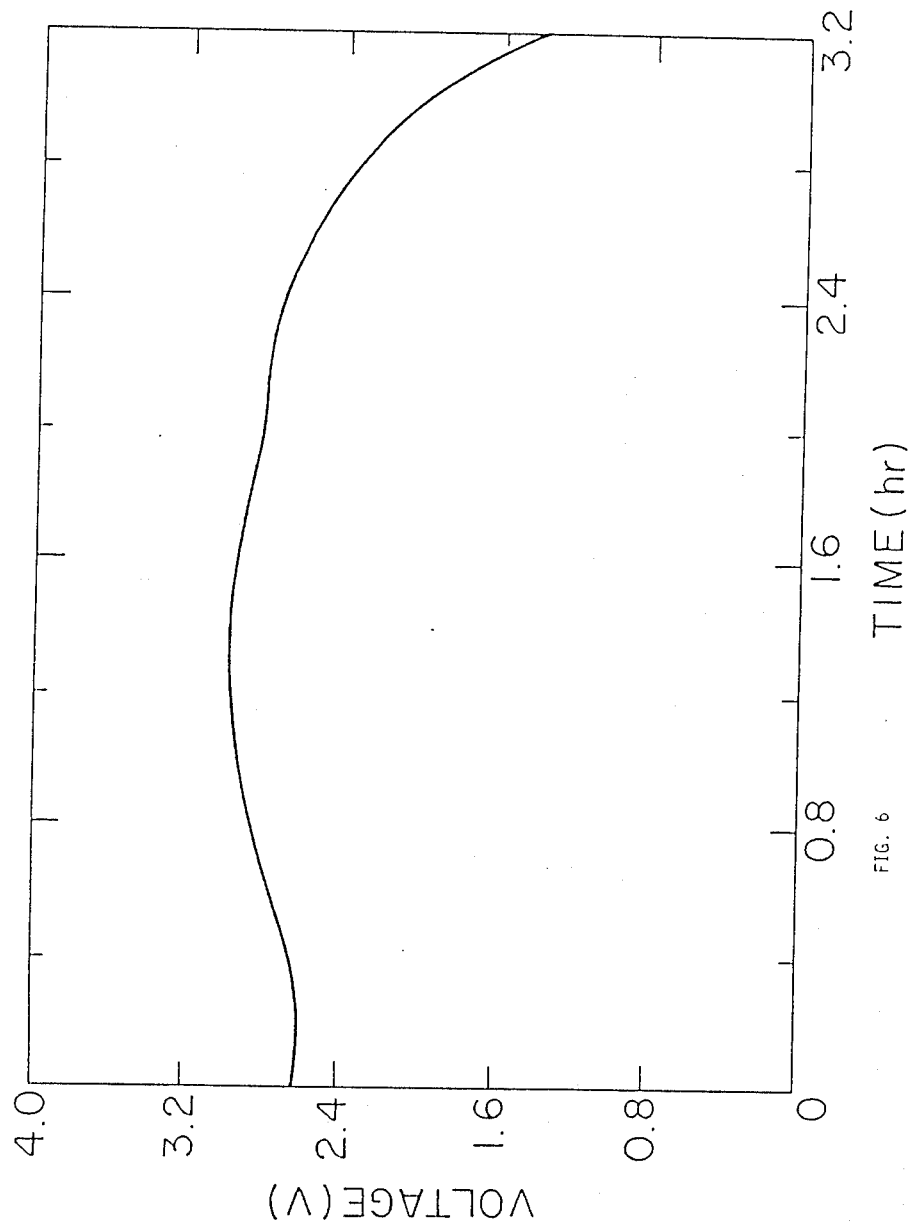
FIG. 6 is a graph of discharge of yet another cell of the invention.

A 1/10 D size hermetically sealed cell (FIG. 3) having calcium anode and 1M Ba(AlCl$_4$)$_2$—SOCl$_2$ solution was discharged at 225° C. for 3 hours at 0.5 mAcm$^{-2}$ (FIG. 6). Its average voltage was 2.8 V.

These two last examples exhibit the excellent stability of the Ca/M(AlCl$_4$)$_2$—SOCl$_2$ cells and their capability to safely deliver power at very high temperatures.

EXAMPLES 5 TO 16

A large variety of cells with the combinations: M/M(AlCl$_4$)$_2$—SOCl$_2$ or mixture of SOCl$_2$ with SO$_2$Cl$_2$ were tested. The results are summarized in Table 3.

For these tests a set up similar to FIG. 1 was used except that they had only one anode, the electrode area was 1 cm$^2$ and the cathode thickness was 0.6 mm. It can be seen that for all combinations having calcium, barium or strontium as an anode and their salts M(AlCl$_4$)$_2$ dissolved in thionyl chloride or a mixture of thionyl chloride and sulfuryl chloride we got OCV above 3 V and working voltage above 2.5 V. These cells delivered current (above 2 V) for 20-30 hours. Total cell capacity to 2 V cut-off was 10-15 mAh. It was found that in practice it is impossible to abuse charge or reverse (overdischarge) these cells. On application of 20 V "charging" voltage the current dropped from several mAcm$^{-2}$ to less than 1 mAcm$^{-2}$ after 5 minutes and after 15 minutes it was between 0.3-0.1 mAcm$^{-2}$ and continued to decline. These cells after being fully discharged were overdischarged by a constant current of 2 mAcm$^{-2}$ to a cut off voltage of −20 V. In 1-30 minutes the cell voltage reached −20 V and than the current declined in a similar way to what has been found in the abuse charging tests.

EXAMPLE 17

A C-size cell (FIG. 2) having a calcium anode and 0.95 mm Teflon-bonded carbon cathode, electrode area 130 cm$^2$ and 0.6M Ba(AlCl$_4$)$_2$—TC electrolyte was assembled. It has an OCV of 3.15 V. It was discharged on 68 load for 95 hr at average voltage of 2.8 V. An abuse charging test of this cell and a reversal test of it are described in FIG. 7.

Figure 7:
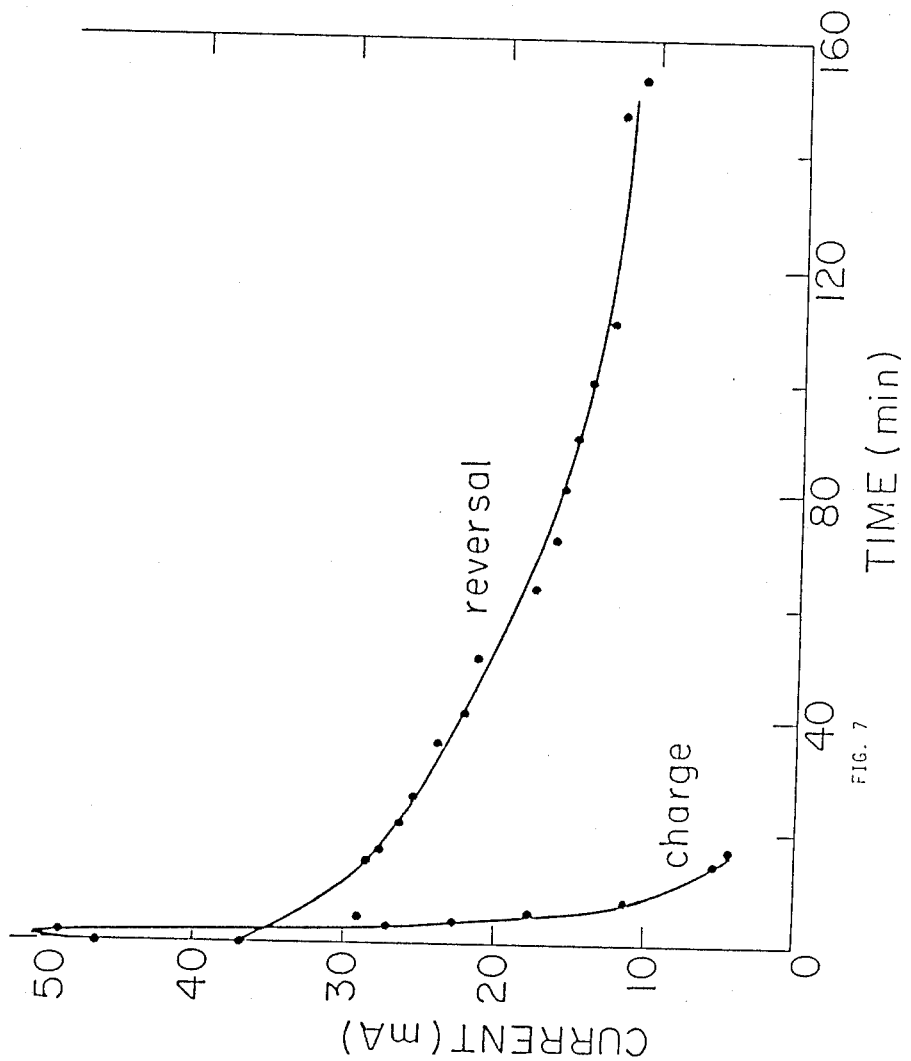
FIG. 7 is a graphical representation of the discharges made according to Example 17.

The cell was "charged" by a current of 50 mA to a cut-off voltage of −20 V (FIG. 7 Curve 1). The voltage raised quickly to the −20 V limit and then the "charging" current decreased to less than 5 mA after 15 minutes of "charging". On the reversal of a fully discharged cell (discharged to 0.5 V cut off voltage) at 40 mA with a cut-off voltage of 20 V, the voltage immediately jumped to 20 V and then the current gradually decreased to less than 12 mA after 2 hours. These experiments exhibit the excellent safety features of this cell, i.e. it is impossible to reach unsafe conditions by abuse charging or overdischarging of it.

TABLE 3

| No. of Example | Anode | Electrolyte (1M) and solvent | OCV (V) | Initial Voltage on 6 KΩ load | Discharge time (hr) (to 2 V) | Charging Current at 20 V after 5 min |
|---|---|---|---|---|---|---|
| 5 | Ba | Ca(AlCl$_4$)$_2$ TC | 3.15 | 2.9 | 23 | 0.5 |
| 6 | Sr | Ca(AlCl$_4$)$_2$ TC | 3.05 | 2.7 | 25 | 0.25 |
| 7 | Mg | Ba(AlCl$_4$)$_2$ TC | | | | |
| 8 | Sr | Ca(AlCl$_4$)$_2$ TC:SC = 1:1 | 3.3 | 2.9 | 26 | 1 |
| 9 | Sr | Ba(AlCl$_4$)$_2$ TC | 3.1 | 2.7 | 22 | 0.5 |

TABLE 3-continued

| No. of Example | Anode | Electrolyte (1M) and solvent | OCV (V) | Initial Voltage on 6 KΩ load | Discharge time (hr) (to 2 V) | Charging Current at 20 V after 5 min |
|---|---|---|---|---|---|---|
| 10 | Mg | Sr(AlCl$_4$)$_2$ TC | | | | |
| 11 | Ba | Ba(AlCl$_4$)$_2$ TC | 3.2 | 2.8 | 28 | 0.5 |
| 12 | Ba | Ba(AlCl$_4$)$_2$ TC:SC = 2:1 | 3.2 | 2.9 | 26 | 0.5 |
| 13 | Ba | Sr(AlCl$_4$)$_2$ TC | 3.1 | 2.8 | 20 | 0 |
| 14 | Sr | Sr(AlCl$_4$)$_2$ TC | 3.15 | 2.8 | 28 | 1 |
| 15 | Ca | Sr(AlCl$_4$)$_2$ TC | 3.0 | 2.9 | 28 | 0.5 |
| 16 | Ca-10% Sr | Ca(AlCl$_4$)$_2$ TC | 3.1 | 2.9 | 28 | 1 |

EXAMPLE 18

Figure 8:
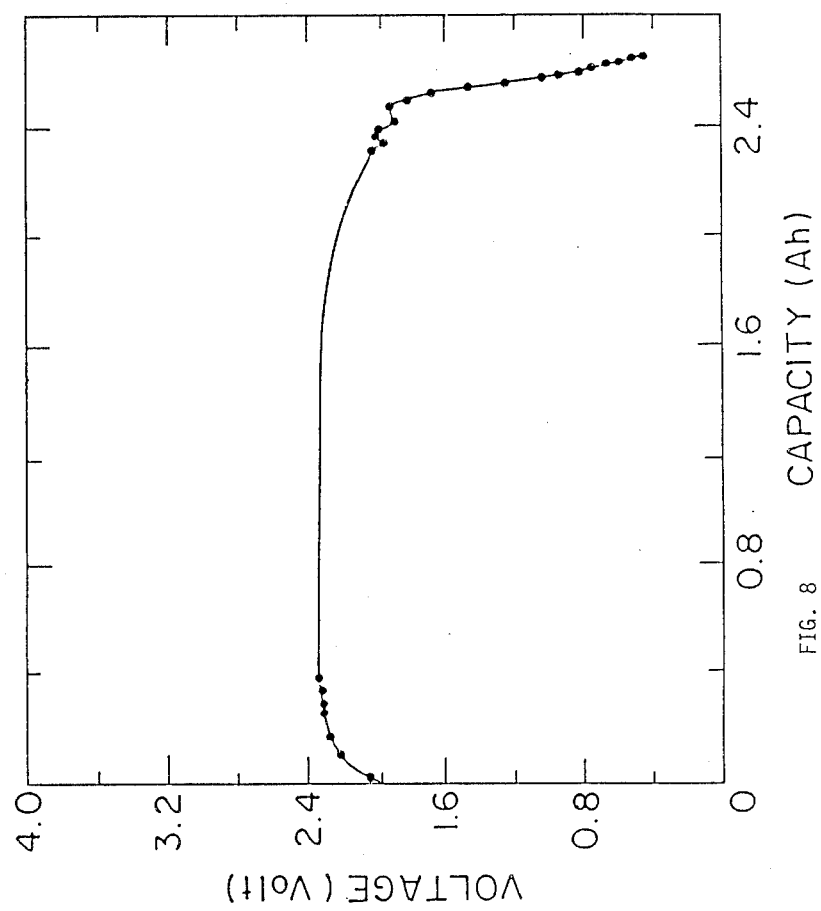
FIG. 8 is a discharge curve of Example 18.
Figure 9:
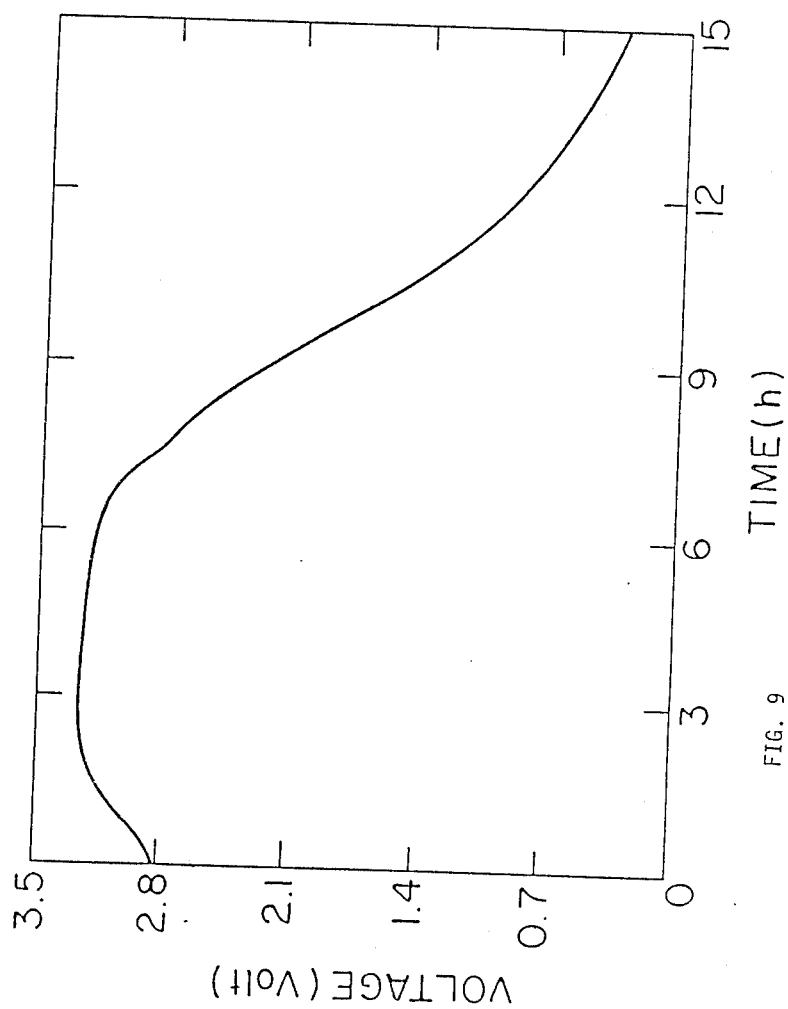
FIG. 9 is a discharge curve of a C-size Ca-thionyl chloride cell.

There was prepared a C-size cell (FIG. 2) of the same construction as that of Example 17, but which contained 1M Ba(AlCl$_4$)$_2$ in SOCl$_2$ solution. The cell was discharged on a 6 ohm load at room temperature with a flat discharge curve delivering 2.4Ah. The discharge curve is given in FIG. 8.

EXAMPLE 19

A similar C-size cell was prepared, containing 1M Ba(AlCl$_4$)$_2$ and 10% (v/v) SO$_2$—SOCl$_2$ solution. It was discharged at 200° C. on a 56 ohm load so as to demonstrate the safety of the cell and its broad temperature range. The cell worked at 200° C. for 10 hours. It was cooled to room temperature and found not to leak or vent. At the end of the test period the cell was heated to 300° C. At about 225° C. the electrolyte vented safely through the glass-metal seal. Heating to 300° C. caused no hazard except for the soft venting at about 225° C.

EXAMPLES 20 AND 21

Figure 10:
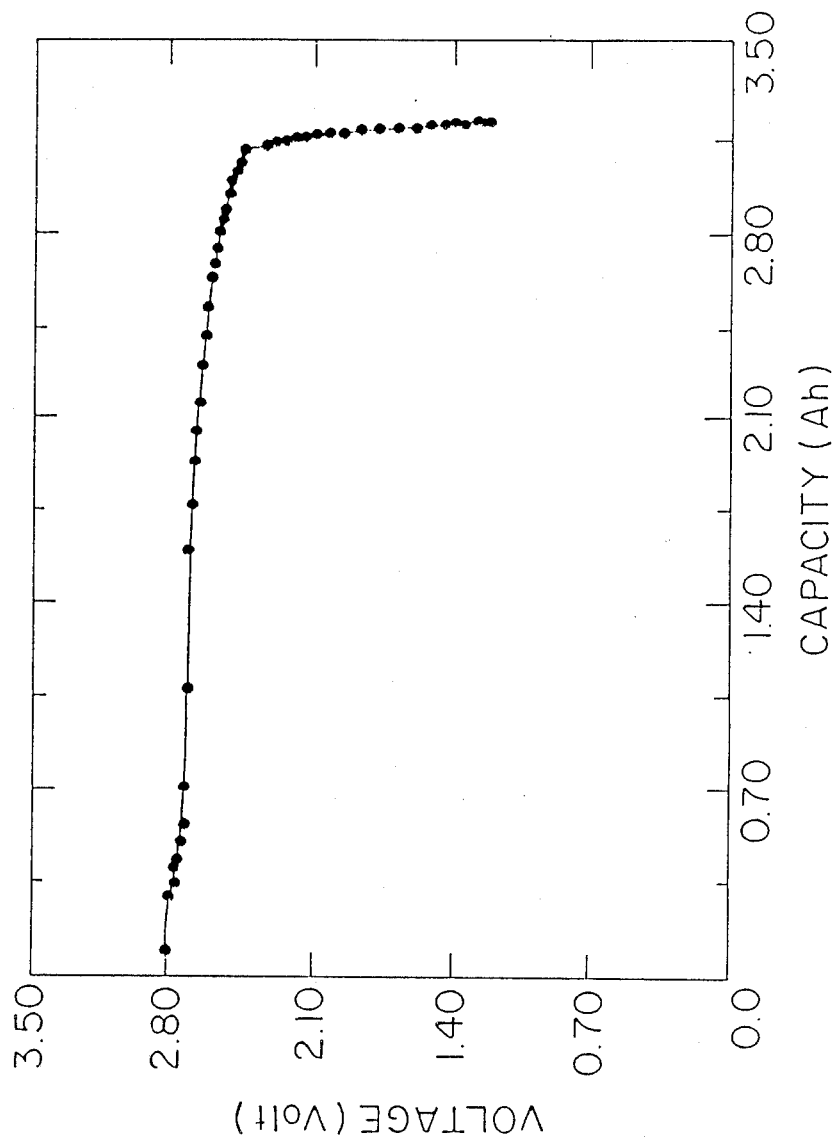
FIG. 10 is a discharge curve of a cell according to Examples 20 and 21.

There were prepared 4 C-size cells of the type of Example 17 and these were stored at 70° C. for 4 weeks. Two of the cells contained 1M Ba(AlCl$_4$)$_2$ in SOCl$_2$ electrolyte and the other two cells contained 1M Sr(AlCl$_4$)$_2$ in SOCl$_2$ electrolyte. After two weeks the cells were stored for a further week at room temperature and after this they were discharged on a 56 ohm load at ambient temperature. The cells delivered 3.1 to 3.3Ah, whereas fresh cells of the same production lot delivered 2.7Ah at the same discharge rate. A typical discharge curve of a cell containing 1M Sr(AlCl$_4$)$_2$ is that of FIG. 10. The results indicate a room storageability of such cells of the order of 3 years.

EXAMPLE 22

The microcalorimetric output of a C-size calcium thionyl chloride cell was measured with a KLB Model 2277 microcalorimeter. It was found that the heat output due to the corrosion of the anode depends on the type of electrolyte used. A typical output for a C-size Ca-SOCl$_2$ cell after 2 months' storage at room temperature was 1000 μW; and 200 μW and 80 μW for cells containing 1M Ca(AlCl$_4$)$_2$, 1M Sr(AlCl$_4$)$_2$ and 1M Ba(AlCl$_4$)$_2$ cells, respectively. The results demonstrate that the self-discharge rate of cells containing 1M Ca(AlCl$_4$)$_2$ is 4 times larger than that of cells containing 1M Ba(AlCl$_4$)$_2$ and is 12 times larger than that of cells containing 1M Sr(AlCl$_4$)$_2$.

The above heat-output values demonstrate that the shelf-life of these cells will be half a year, 2.5 years and 5 years, respectively. This clearly demonstrates the substantially extended shelf-life of cells of the present invention vis-a-vis cells of the prior art.

EXAMPLE 23

Experiments have shown that the conductivity of the electrolyte can be substantially increased by the addition of sulfur dioxide (SO$_2$). Table 4 summarizes the effect of addition of SO$_2$. The increase of the conductivity of the electrolyte means a better utilization of the cathode and a higher rate capability.

TABLE 4

| Electrolyte conductivity as function of SO$_2$ Concentration by Volume, at 20° C. | | |
|---|---|---|
| SO$_2$ % | CONDUCTIVITY (mS/cm) | |
| V/V | 1.3 M Sr(AlCl$_4$)$_2$ | 1.3 M Ba(AlCl$_4$)$_2$ |
| 0 | 1.8 | 2.3 |
| 10 | 4.6 | 7.0 |
| 20 | 11.5 | 8.3 |
| 30 | 13.5 | 9.0 |

We claim:

1. An electrochemical cell of the type having a liquid cathode, an inert current collector, and an alkaline metal anode, made of calcium, magnesium, barium or strontium, or dischargeable alloys of any of these essentially free of alkali metals, wherein the liquid cathode comprises a soluble salt of barium or strontium.

2. A cell according to claim 1, wherein the liquid cathode comprises an inorganic oxyhalide.

3. A cell according to claim 1, where the liquid cathode comprises a solution of (a): Ba(AlCl$_4$)$_2$; (b): Sr(AlCl$_4$)$_2$; (c): a mixture of (a) and (b); or (d): a mixture of (a), (b) or (c) with Ca(AlCl$_4$)$_2$.

4. A cell according to claim 1, wherein the current collector is an inert porous material.

5. A cell according to claim 1, containing from 3 to 80 volume percent sulfur dioxide calculated on the liquid cathode.

6. A cell according to claim 1, wherein the liquid cathode further comprises a tetraalkyl ammonium halide, or a fluorinated hydrocarbon.

7. A cell according to claim 1, wherein the soluble salt consists of strontium aluminum tetrachloride, barium aluminum tetrachloride or a mixture thereof.

8. A cell according to claim 1, where the anode is made of essentially pure calcium or an alloy thereof with strontium or barium, and the soluble salt is Sr(AlCl$_4$)$_2$, Ba(AlCl$_4$)$_2$ or a mixture thereof.

9. A cell according to claim 1, wherein the porous current collector is made of Teflon-bonded carbon.

10. A cell according to claim 9, wherein the porous current collector comprises 1-50% of catalysts from the group Ni, Cr, Mo, Pt, Au, Co, in the form of metallic powder or compounds of these metals.

11. A cell according to claim 1, comprising 10-30 volume percent added sulfur dioxide based on the liquid cathode.

12. A cell according to claim 1, comprising 20-30 volume percent added sulfur dioxide based on the liquid cathode.

13. A cell according to claim 3, wherein the liquid cathode consists of a solution of (a), (b) or (c) in thionyl chloride.

14. A cell according to claim 3, wherein the liquid cathode consists of a solution of (a), (b), (c), or (d) in thionyl chloride.

* * * * *